(12) United States Patent
King

(10) Patent No.: US 7,524,091 B2
(45) Date of Patent: Apr. 28, 2009

(54) LED BULB REFRACTIVE RELECTOR

(75) Inventor: Robert Lee King, Seymour, IN (US)

(73) Assignee: Valeo Sylvania LLC, Seymour, IN (US)

( * ) Notice: Subject to any disclaimer, the term of this patent is extended or adjusted under 35 U.S.C. 154(b) by 147 days.

(21) Appl. No.: 11/659,669

(22) PCT Filed: Aug. 8, 2005

(86) PCT No.: PCT/US2005/028010

§ 371 (c)(1), (2), (4) Date: Aug. 13, 2007

(87) PCT Pub. No.: WO2006/020535

PCT Pub. Date: Feb. 23, 2006

(65) Prior Publication Data

US 2008/0106903 A1    May 8, 2008

Related U.S. Application Data

(60) Provisional application No. 60/600,326, filed on Aug. 9, 2004.

(51) Int. Cl.
*F21V 7/00* (2006.01)

(52) U.S. Cl. .................. 362/311; 362/511; 362/551; 362/615

(58) Field of Classification Search .............. 362/511, 362/555, 551, 310, 311, 800
See application file for complete search history.

(56) References Cited

U.S. PATENT DOCUMENTS

| | | | |
|---|---|---|---|
| 3,593,014 A * | 7/1971 | Vesely ................ 362/291 |
| 5,349,504 A | 9/1994 | Simms et al. |
| 6,193,383 B1 | 2/2001 | Onikiri et al. |
| 6,871,988 B2 | 3/2005 | Gebauer et al. |
| 7,118,253 B1 * | 10/2006 | Simon ................ 362/328 |
| 7,438,454 B2 * | 10/2008 | Chinniah et al. ...... 362/500 |
| 2003/0235050 A1 * | 12/2003 | West et al. .......... 362/327 |

* cited by examiner

*Primary Examiner*—Ali Alavi
(74) *Attorney, Agent, or Firm*—William E. Meyer

(57) ABSTRACT

A light guide may be made from a plurality of substantially planar, light transmissive arms paralleling and radiating from a common axis. The planar arms in combination define a common cavity extending along the axis sufficiently large to envelope a light source. At least one arm has an input window facing the common cavity, a reflective wall aligned with respect to the common cavity and an input window. Light received from the direction of the common cavity through the input window is generally reflected in an axial direction. The light guide has an output window extending from an intersection point with the reflective wall towards the axis. The plurality of arms is preferably supported on a base.

16 Claims, 2 Drawing Sheets

FIG. 1

LED BULB REFRACTIVE RELECTOR

CROSS-REFERENCE TO RELATED APPLICATIONS

The Applicant hereby claims the benefit of his provisional application, Ser. No. 60/600,326 filed Aug. 9, 2004 for LED BULB REFRACTIVE RELECTOR

BACKGROUND OF THE INVENTION

1. Field of the Invention

The invention relates to electric lamps and particularly to automotive lamps. More particularly the invention is concerned with a light guide used with an automotive lamp having LED light sources.

2. Description of the Related Art Including Information Disclosed under 37 CFR 1.97 and 1.98

LEDs are at the same time becoming sufficiently luminous and inexpensive to be used in exterior vehicle signal lighting. In part this is the result of individual LEDs becoming brighter. Brighter, is not a universal good. Onlooking viewers need to be protected from direct view of an intense light source. It is also known that humans perceive a signal light source with greater rapidity if the source has greater area, even if the number of lumens is the same. A tiny intense source may provide all the necessary light, but it is unacceptable if the viewer is blinded in acquiring in the lamp image, and similarly it is unacceptable if the light source so small for that one cannot recognize it as a part of a vehicle. There is then a need for a vehicle light source with a broad and slightly diffuse image to not blind a viewer and to enable rapid recognition.

BRIEF SUMMARY OF THE INVENTION

In one embodiment the optical light guide was formed form eight planar sections radiating in planes parallel to a common axis. In combination the planar sections formed, an axial view a star configurations with each radial arm extending from the common axis. Each arm was equal angularly spaced from its two adjacent neighbors. In an axial cross section an arm and a corresponding diametric arm defined and internal cavity sufficient to envelope an LED lamp with a internal dome extending to a optical input window that was offset from the LED lamp and extended parallel to the common axis so as to intercept light emitted by the LED lamp. The preferred LED lamp had a mushroom shape with the LEDs positioned under the wall of the rim of the mushroom cap. Light is radiated down and radially from the cap of the mushroom. Light received through the input window is internally reflected in the light guide and otherwise directed towards a reflective region formed on a lower outer wall. The lower outer wall provides substantially totally internal reflection. It could be silvered for reflectivity. The preferred reflective wall extended as a smooth curve from a lower end of the optical input window to an intersection point with an optical output window. The preferred reflective wall portion was substantially oriented to intercept light from the LED lamp through he input window at approximately 45 degrees, to reflect such light forward at approximately 45 degrees towards the optical output window. The preferred optical output window is a generally arc through a smooth curved region extending from the intersection point with the reflective wall through the common axis and diametrically across to a similarly formed arm extending in the same plane on the other side of the common axis. The surface of the output window may be locally smooth or may be formed with lenticules to disperse or re-direct light in preferred directions. The radial arms and the wall thickness of the respective arm sections is a matter of design choice. The more arms and the thicker the arms the more light is captured and transmitted forward.

DETAILED DESCRIPTION OF THE INVENTION

Figure 1:
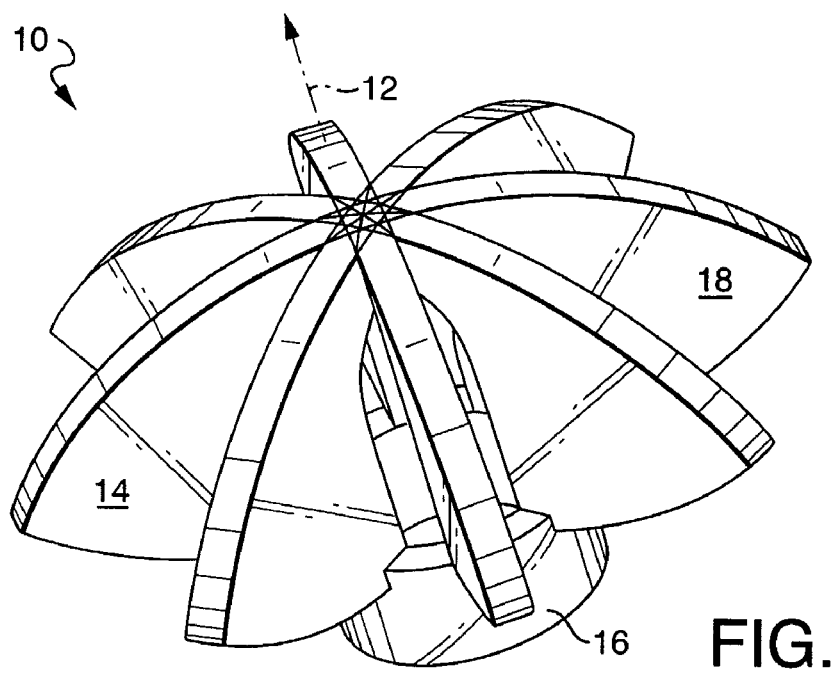
FIG. 1 shows a perspective view of a preferred light guide.
Figure 2:
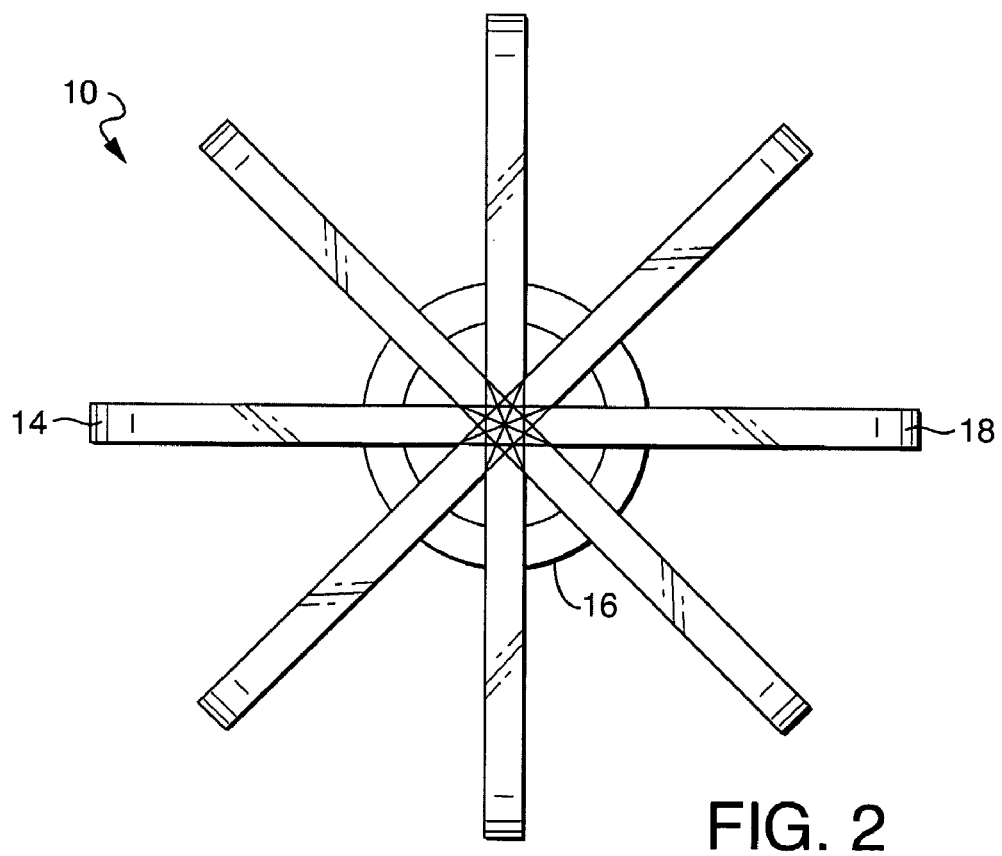
FIG. 2 shows an axial end view of a preferred light guide.

FIG. 1 shows a perspective view of a preferred light guide 10. In one embodiment the optical light guide 10 was formed from eight planar arm sections radiating in planes parallel to a common axis 12. In combination the planar sections formed, in an axial view, a star configuration with each radial arm 14 extending from the common axis 12. Each arm 14 was preferably spaced at equal angles from its adjacent neighbors. FIG. 2 shows an axial end view of the preferred light guide 10. The arms 14 are further supported by a common base, which may have the form of a ring 16.

Figure 3:
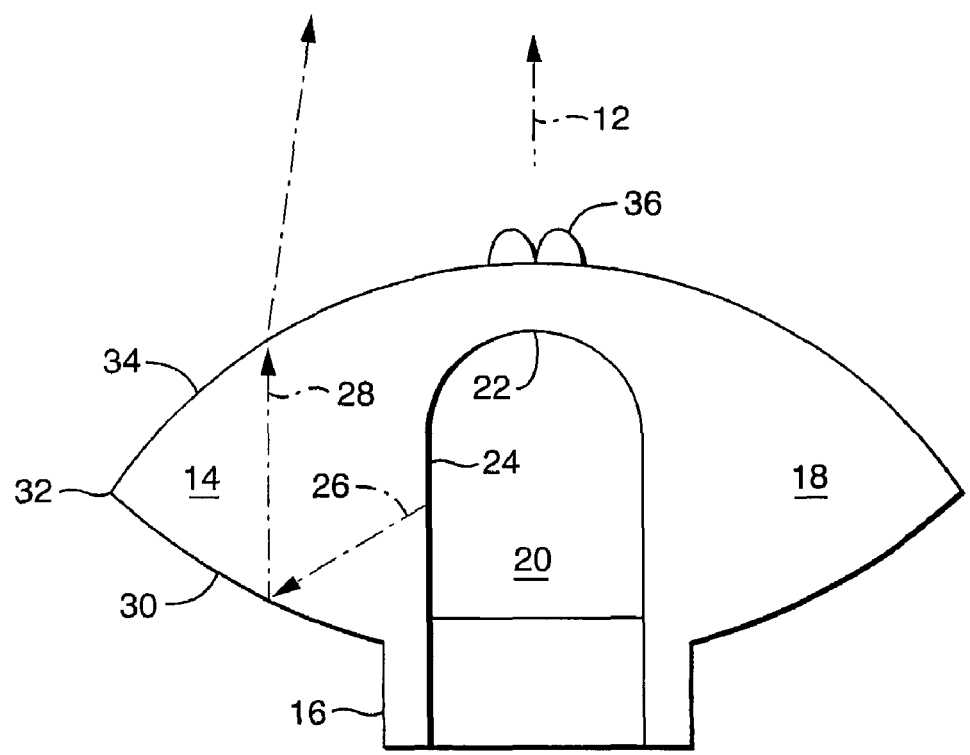
FIG. 3 shows a cross sectional view of a preferred light guide.

FIG. 3 shows a cross sectional view of a preferred light guide 10. In an axial cross section, an arm 14 and a corresponding diametric arm 18 define between them an intermediate, internal cavity 20. All the respective arms thereby similarly define a common central cavity; the common cavity is sufficient to envelope a lamp. The defined cavity 20 includes an internal bridge or dome 22 extending between pairs of radial arms (e.g. 14, 18). The dome 22 extends from the axis 12 to an optical input window 24 that is offset from the lamp and extends with at least one directional component parallel to the common axis 12. The input window 24 is thereby positioned near the lamp to intercept light emitted by the lamp.

Figure 4:
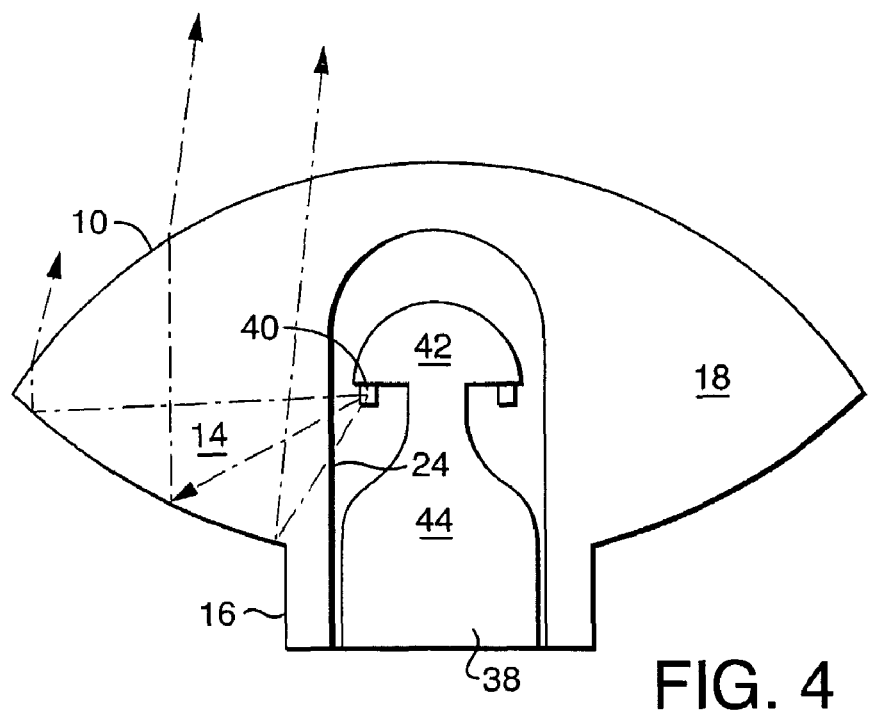
FIG. 4 shows a cross sectional view of a preferred light guide and LED light source.

FIG. 4 shows a cross sectional view of a preferred light guide and light source. The preferred light source is an LED lamp with a mushroom shape wherein the LEDs 40 are positioned under the rim of the mushroom cap 42, and the mushroom stem 44 extends in the axial direction. Light may be radiated generally in a quadrant extending from the negative axial direction, that is down from the mushroom cap 42, to a ray extending radially away from the LED 40, that is outward in the plane of the mushroom cap 42. The lamp 38 is oriented so that the input window 24 of the light guide 10 generally intercepts light radiated in this quadrant. Ideally the emission of each LED 40 is aligned with, and spanned by a corresponding arm 14 to maximize light transfer from the LED 40 into the respective input window 24.

Light received through the input window 24 of the light guide 10 is internally directed towards a lower outer wall. The lower outer wall is arranged to reflect the received light 26. The reflectivity may be achieved by arranging the lower wall to be substantially totally internally reflective, thereby forming a reflective wall 30 of the light guide 10. The lower outer wall may also be metallized for reflectivity. The preferred reflective wall 30 extends as a smooth curve from a lower end of the optical input window 24 or from the support ring 16 to am intersection point 32 with an optical output window 34. The preferred reflective wall 30 is substantially oriented to intercept the received light 26 from the LED lamp that passes through the input window 24, and oriented to reflect such received light 26 forward, such as ray 28, towards the optical output window 34. The preferred optical output window 34 has the general form of an arc extending as a smooth curve extending from the intersection point 32 of the reflective wall 30 through the common axis 12 and diametrically across to a similarly formed arm 18 extending in the same plane on the other side of the common axis 12. It is understood that the reflective wall need not intersect the output window directly. An intermediate wall, support or other feature may be inserted intermediate the two. The surface of the output window 34 may be locally smooth or may be formed with lensing or diffusing features 36 (Fresnel, lenticules, roughened surface, etc. as known in the art.) to focus, or disperse light in preferred directions or patterns. The diameter of radial arm 14 and the wall thickness of the arm 14 is a matter of design choice. The more arms and the thicker the arms the more light is captured and transmitted forward.

The light guide 10 may be axially slipped over the lamp and secured by a compression fit between the light guide and the lamp, by a latching mechanism formed between the base portion of the lamp and the support ring 16, or by a latching mechanism formed between the support ring 16 and a lamp housing supporting the lamp. Threaded, bayonet, snap and numerous other latching mechanisms are known in the art and the election of one is considered to be a matter of design choice. FIG. 4 shows a cross sectional view of a preferred light guide and LED light source.

It is understood that the number, angular arrangement, wall thicknesses, and radial extents of the different arms may each be varied by choice to generate differing axially viewed patterns. Similarly, the surface of the output window 34 may be formed with optical features to spread, focus or diffuse light as is known in the art. Similarly the light guide, while transparent, may be colored. The light guide provides a symmetric distribution of light without generating a mirrored surface look to a viewer. The hot spot of the lamp is also dispersed, so as not blind a viewer. In one embodiment the light guide had a diameter of about 10 centimeters and a height of about 8 centimeters. There were eight symmetrically arranged arms, each being formed from planar sections of amber colored plastic, about 6 mm thick.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A light guide comprising:
   a plurality of substantially planar, light transmissive arms paralleling and radiating from a common axis;
   the planar arms in combination defining a common cavity extending along the axis sufficiently large to envelope a light source;
   at least one arm having an input window facing the common cavity including a reflective wall aligned with respect to the common cavity and the input window to generally reflect light received from the direction of the common cavity through the input window generally in an axial direction; and having further an output window extending from an intersection point with the reflective wall towards the axis; and
   a base supporting the plurality of arms.

2. The light guide assembly in claim 1, wherein the input window is a smooth surface.

3. The light guide assembly in claim 1, wherein the input window is a smooth surface extending parallel to the axis.

4. The light guide assembly in claim 1, wherein the reflective wall is a smooth surface.

5. The light guide assembly in claim 1, wherein the reflective surface is metallized.

6. The light guide assembly in claim 1, wherein the reflective wall is a smoothly curved surface positioned to intercept light rays passing intermediate the base and a line transverse to the axis extending through the input window.

7. The light guide assembly in claim 1, wherein the output window is a smooth surface extending from an intersection point with the reflective wall towards the axis.

8. The light guide assembly in claim 1, wherein the output window is a smooth surface extending from an intersection point with the reflective wall to the axis.

9. The light guide assembly in claim 1 wherein the output surface is formed with light refractive lenticules.

10. The light guide assembly in claim 1, wherein a plurality of similar light sources are positioned around the axis and a plurality of similar light guide arms are similarly positioned around the axis to receive light from one or more of the respective light sources.

11. The light guide assembly in claim 9, wherein the base is a ring defining an entry passage to the defined cavity.

12. The light guide assembly in claim 1, wherein the plurality of arms is symmetrically distributed around the axis.

13. The light guide assembly in claim 9, wherein the plurality of light guides is formed as a unitary structure.

14. The light guide assembly in claim 1, wherein the input surface extends with a constant angle with respect to the axis.

15. The light guide assembly in claim 1, wherein the input surface extends parallel to the axis.

16. A lamp assembly comprising:
   a light source having an axis and the light source emitting light radially away from the axis; and
   a radial light guide formed from a light transmissive material, with an exterior input window, a reflective wall and an exterior output window, and otherwise shaped to define an internal cavity enclosing the light source, the input window facing the cavity and extending with a component direction generally parallel to the axis is generally aligned to be transverse to the emitted light whereby the input window is located in the path of light emitted from the light source;
   the reflective surface being offset from and optically aligned with respect to light received through the input window from the light source, and being a smooth curve oriented at least one angle to the input window to reflect light toward the output window;
   the output window being optically aligned with light received through input window and reflected by the reflective wall, the output window being a smooth curve extending away from the axis toward the reflective surface.

* * * * *